Patented Apr. 3, 1951

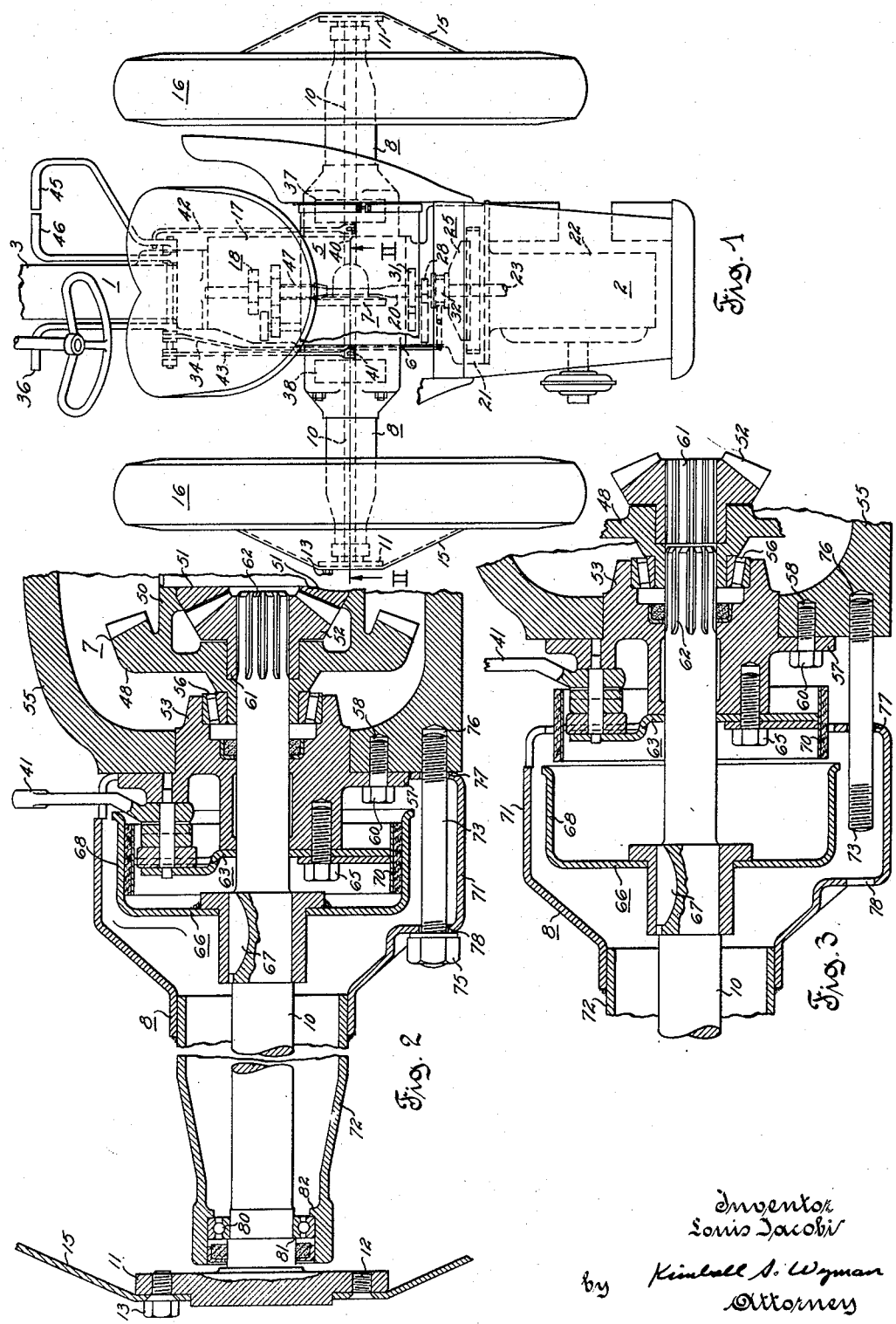

2,547,268

UNITED STATES PATENT OFFICE 2,547,268

WITHDRAWABLE DRIVE SHAFT AND BRAKE ASSEMBLY FOR VEHICLE DRIVE WHEELS

Louis Jacobi, Milwaukee, Wis., assignor to Allis-Chalmers Manufacturing Company, Milwaukee, Wis., a corporation of Delaware Application September 29, 1948, Serial No. 51,704

7 Claims. (Cl. 180—75)

This invention relates generally to braking means and is more particularly directed to a tractor final drive unit including braking means therefor.

In an agricultural tractor designed to straddle two or more rows of standing crop with the tractor wheels traveling in the space between the rows, it is essential to have a maximum amount of ground clearance for that portion of the rear axle housing adjacent each wheel in order to permit cultivation of a greater height of standing crop thus enabling crops, such as corn, to be cultivated throughout a greater portion of the growing period. To provide this clearance it has heretofore been customary in the design and manufacture of tractors to either (1) use an extremely large diameter rear wheel which increases the cost of the tractor considerably, or (2) use a drop-type rear axle construction which is also expensive in that additional parts, including gears, must be used, or (3) slenderize the rear axle housing as much as possible by moving the brake mechanism for the rear wheels into close relation with the center line of the tractor. In the construction of the smaller and less powerful type of agricultural tractors the last mentioned design has been generally found to be the most desirable in that it affords an economical construction without sacrificing operating efficiency. However, this preferred design has heretofore presented a serious service problem in that in order to adjust or repair the brake mechanism it has been necessary to remove the wheel and disassemble the final drive unit up to its point of junction with the differential casing before the brake mechanism was sufficiently exposed for servicing.

A solution of this problem is incorporated in the present invention which has for its principal object the provision of a final drive unit having parts, including braking means, constructed and arranged in a novel and improved manner so as to permit the withdrawal of the rear wheel, axle housing, axle shaft and brake drum, as a unit from the differential casing and brake friction element carried thereby.

It is also an object of this invention to provide an enclosed rotatable shaft including braking means therefor which are readily accessible for servicing and which unit is simple and compact in construction, efficient in operation and lends itself to production at a relatively low cost.

The construction and operation of apparatus capable of accomplishing the above stated objects will become readily apparent as the disclosure progresses and particularly points out the various advantages and features considered of special importance. And accordingly, the present invention may be considered as comprising the various features of construction, combinations and subcombinations of elements or parts as is hereinafter more fully set forth in the detailed description and appended claims, reference being had to the accompanying drawings in which:

Fig. 1 is a partial plan view of a tractor embodying the present invention, with certain of the enclosed parts thereof shown in dotted lines;

Fig. 2 is an enlarged sectional view taken along line II—II in Fig. 1; and

Fig. 3 is a view similar to that shown in Fig. 2 with the axle housing unit having been axially moved away from the differential casing.

Referring to Fig. 1, it will be seen that the apparatus chosen to illustrate the present invention comprises generally a tractor 1 having a rear driving unit 2 and a forwardly extending frame 3. The rear driving unit includes a transverse final drive housing 5 having an enlarged central portion 6 operatively enclosing a conventional differential drive mechanism 7 and having a pair of oppositely projecting axle shaft housings 8 each enclosing an axle shaft 10 having its inner end operatively connected with the differential mechanism 7. The outer or exposed end of each axle shaft terminates in a radially flanged hub portion 11 provided with a circular series of circumferentially spaced holes 12 (see Fig. 2) through which are inserted bolts 13 fixedly attaching the central disk portion 15 of a driving wheel 16 thereto. The central portion 6 of the final drive housing includes an integral forwardly extending portion 17 operatively enclosing a change speed gearing 18 drivingly connected with the differential mechanism 7, this gearing including a power input shaft 20 extending rearwardly through the central portion of the final drive housing in overlying relation to the differential mechanism therein and into the adjacent end of a clutch and flywheel housing 21 detachably bolted or otherwise rigidly secured to the rear side of the final drive housing 5 in rearwardly overhanging relation thereto.

A conventional internal combustion engine power unit 22 is detachably bolted to the rear end of housing 21 and is thereby supported in rearwardly overhanging relation to central portion 6 of final drive housing 5, the adjacent end of the engine crank shaft 23 entering housing 21 and having mounted thereon a flywheel and clutch element 25. An axially aligned shaft extension mounts a shiftable clutch element selectively engageable with a clutch element fixed to engine crank shaft 23 in a conventional manner (not shown), and the shaft extension has mounted on its end remote from engine 22 a gear 29 which is drivingly connected in a suitable manner (not shown) to a gear 31 positioned on the adjacent end of shaft 20 for rotation therewith. Power is thus transmitted through this power input shaft to the change speed transmission 19 and thence through the differential mechanism 7 to the separate rear axle shafts 10. A clutch element shift collar 32 is provided with an arm which extends through an opening (not shown) in housing 21 and is operatively connected with the rear end of an actuating rod 34 which extends forwardly through a portion of the axle housing 8 and along the adjacent side of the forwardly extending portion 17 of the final drive housing 5 for suitable connection (not shown) with a clutch pedal 36.

The central enlarged portion 6 of the final drive housing also encloses brake means 37 and 38 symmetrically arranged with respect to the longitudinal axis of the forwardly extending portion 17 enclosing the change speed gearing 18, there being a brake means positioned for association with each axle shaft 10 so as to control rotation thereof for braking and turning purposes as is common practice. Each brake means is provided with a separate actuating arm 40 and 41 (see also Fig. 2) operatively connected with a forward extending actuating rod or link 42 and 43, these links being positioned adjacent opposite sides of the forwardly extending housing portion 17 and having suitable connection (not shown) with separate brake pedals 45 and 46.

Referring more particularly to Fig. 2, it may be seen that a conventional differential gearing 7 is employed to transmit power from the transmission output shaft 47 (Fig. 1) through a ring gear 48, differential carrier 50, pinion gears 51 and side gear 52 to axle shaft 10. And in this connection, it will be noted that ring gear 48 is rotatably mounted in a bearing structure 53 carried by the differential casing 55 by suitable means such as the roller bearing 56. This bearing structure 53 extends outwardly through an opening (not shown) in the side of the differential casing 55 and includes a flanged portion 57 having bolt receiving openings (not shown) therethrough, this flange being adapted to abut the adjacent surface of the casing 55 in a manner affording alignment of the openings in the flange with internally threaded bores 59 in the casing so that cap screws 60 may be placed in these aligned openings to secure bearing structure 53 to differential casing 55. Also, side gear 52 includes an internally splined hollow shaft portion 61 into which the splined end 62 (see Fig. 3) of axle shaft 10 may be thrust to receive power from engine 22 transmitted through differential gearing 7. In this respect, it should be obvious (see Fig. 1) that the opposite or right hand side of the differential includes a similar side gear which is mounted in a bearing structure similar to that just described. It is believed that a description of one axle shaft and parts associated therewith is sufficient for a proper understanding of the present invention.

A conventional expansion type brake mechanism 63 is detachably secured to the outer portion of bearing structure 53, by cap screws 65 or the like, in coaxial relation with axle shaft 10. And a brake actuating arm 41 extends upward therefrom for connection with the brake pedal 46 as previously described. At this point it will be noted that bearing structure 53, brake 63 and the brake actuating means including arm 41 comprise a unitary structure which may be separated from casing 55 by removing cap screws 60. And, also, that this unitary structure may in turn be separated into its component parts upon removal of cap screws 65. A brake drum 66 is nonrotatably secured to axle shaft 10, as by a key 67, and includes a flanged friction surface 68 positioned in circumferentially spaced overlying relation to brake shoe 70. Expansion of brake shoe 70 will cause same to bear against brake drum portion 68 and retard the rotating motion of axle shaft 10. And surrounding brake mechanisms 63, drum 66 and axle shaft 10 is an elongated tubular axle housing 8 having a somewhat enlarged portion 71, rectangular in cross section and of relatively short length, enclosing brake means 38 and having a relatively long narrow portion 72 fixed thereto, as by welding, and projecting outwardly to the free end of the axle shaft 10. Axle housing 8 is detachably fixed to the side of differential casing 55 in any suitable manner such as by the use of a stud 73 and nut 75 as shown in Fig. 2. In this illustration, differential casing 55 has internally threaded bores 76 in the outer side thereof adapted for alignment with openings 77 and 78 in the four corners of rectangular portion 71 of axle housing 8 and stud 73, threaded at either end, is placed through aligned openings 76, 77 and 78 and nut 75 is placed on the outer end (see Fig. 1) to fixedly secure axle housing 8 to differential casing 55. A roller bearing 80 on the outer end of axle shaft 10 maintains the axle in spaced relation to that end of the axle housing 8 and permits rotation of same relative to the housing. In this respect it will be noted (Fig. 2) that shaft 10 is axially fixed relative to housing 8 by oppositely facing shoulder portions 81 and 82, formed on the axle and housing, respectively, which shoulders abut opposite sides of roller bearing 80. And, as previously mentioned, the outer end portion of axle shaft 10 terminates in a hub portion 11 to which a wheel disk 15 is secured.

Looking now at Fig. 3, it may be seen that the brake actuating means and the shoe mounted thereon have been exposed by removal of axle housing 8 from differential casing 55 in a manner now to be described, having in mind from the foregoing description that wheel 16, shaft 10, axle housing 8 and brake drum 66 are all separably interconnected and form a unitary structure to be hereinafter referred to as the axle housing unit. In order to remove this structure from its position fixedly abutting differential casing 55 nuts 75 are removed and the axle housing unit is shifted axially away from differential casing 55. This movement separates cooperating splined portions 62 and 61 of shaft 10 and gear 52, respectively, and withdraws the axle housing unit from its supported position on studs 73. As viewed in Fig. 3, the axle housing unit has been axially shifted to the left a sufficient distance to expose brake shoes 70 for repair or replacement and it will be obvious that further movement in this direction will completely separate the axle housing unit from the tractor.

From the foregoing description, it is apparent that a tractor final drive unit constructed in accordance with the present disclosure includes features affording the various advantages hereinabove stated as objects of this invention. More specifically, a unit so constructed provides sufficient ground clearance to permit operation of a tractor over rows of standing crops, and also provides a readily detachable axle housing unit affording easy access to the brake mechanism which unit is simple and compact in construction, efficient in operation and may be produced at a relatively low cost.

And although the invention is illustrated as applied to a self propelled vehicle, it is to be understood that certain of the objects can be accomplished with any power driven unit having a rotatable shaft and braking means therefor and that it is not intended to limit the invention to the exact constructions and combinations shown and described as certain features thereof are of more general application and as various modifications within the scope of the appended claims may occur to persons skilled in the art.

It is claimed and desired to secure by Letters Patent:

1. In a casing structure enclosing a power driven rotary element and having one wall thereof provided with an opening therethrough affording access to an opposed portion of said element, a bearing housing removably fixed in said opening in coaxial alignment with said element through a detachable connection with a portion of said wall adjacent said opening, a shaft withdrawably journaled in said bearing housing with its inner end disposed in withdrawable power transmitting relation to said power driven element and with its other end projecting outward from said housing, expansible brake means detachably secured to an outer portion of said housing in concentric relation to said shaft, and a brake drum fixed to said shaft and positioned thereby in externally telescoped, cooperative relation to said expansible brake means.

2. In combination with a casing structure enclosing a power driven rotary element, a rotatable shaft withdrawably cooperatively engaging said element and extending outwardly through said casing structure, means removably mounted in said casing and rotatably supporting said shaft, said means having a portion thereof extending through and beyond the outer wall of said casing, expansible friction means detachably supported on the outwardly extending portion of said shaft supporting means, and a brake drum fixed to said shaft and positioned thereby in externally telescoped, cooperative relation to said expansible brake means.

3. In a casing structure enclosing a power driven rotary element and having one wall thereof provided with an opening therethrough affording access to an opposed portion of said element, a bearing housing removably fixed in said opening in coaxial alignment with said element through a detachable connection with a portion of said wall adjacent said opening, a shaft withdrawably journaled in said bearing housing with its inner end disposed in withdrawable power transmitting relation to said power driven element and with its other end projecting outward from said housing, expansible brake means detachably secured to an outer portion of said housing in concentric relation to said shaft, a brake drum fixed to said shaft and positioned thereby in externally telescoped, cooperative engagement with said brake means, and an elongated housing detachably mounted on said wall of said casing in axially fixed, enclosing relation to said shaft.

4. In combination with a casing structure enclosing a power driven rotary element, a rotatable shaft withdrawably cooperatively engaging said element and extending outwardly through said casing structure, a unitary structure comprising a bearing means removably mounted in said wall in supporting relation to said shaft and having a portion thereof projecting outward from said wall, and comprising an expansible brake means detachably fixed to the projecting portion of said bearing means, and a brake drum fixed to said shaft and positioned thereby in externally telescoped, cooperative relation to said expansible brake means.

5. In combination with a casing structure enclosing a power driven rotary element, a rotatable shaft withdrawably cooperatively engaging said element and extending outwardly through said casing structure, a unitary structure comprising a bearing means removably mounted in said wall in supporting relation to said shaft and having a portion thereof projecting outward from said wall, an expansible brake means detachably fixed to the projecting portion of said bearing means, and comprising means supported by said bearing and brake means operable to actuate the latter, a brake drum fixed to said shaft and positioned thereby in externally telescoped, cooperative relation to said expansible brake means, and an elongated housing detachably mounted on said wall of said casing in axially fixed enclosing relation to said shaft.

6. In combination with a casing structure enclosing a power driven rotary element, a rotatable shaft withdrawably cooperatively engaging said element and extending through and beyond a wall of said casing structure, a unitary structure comprising a bearing means removably mounted in said wall in supporting relation to said shaft and having a portion thereof projecting outward from said wall, expansible brake means detachably fixed to the projecting portion of said bearing means, and comprising means operable to actuate said expansible brake means, a brake drum fixed to said shaft and positioned thereby in externally telescoped, cooperative relation to said expansible brake means, and an elongated housing detachably mounted on said wall of said casing in axially fixed enclosing relation to said shaft, whereby said elongated housing, shaft and brake drum may be separated as a unit from said casing structure to thereby expose said expansible brake means, actuating means and bearing means.

7. In a motor vehicle having an engine and traction means for propelling same, and having means including differential gearing for transmitting power from said engine to said traction means, the combination comprising a casing structure enclosing the differential gearing, a pair of elongated axle housings detachably secured to opposite sides of said casing structure, an axle shaft rotatably mounted in each of said axle housings in axially fixed relation thereto, said shaft having one end thereof withdrawably cooperatively engaging an element of said gearing, means rotatably supporting said axle shafts including an elongated bearing structure removably disposed in each of said opposite side walls of said casing structure and extending into said axle housing, an expansible brake means detachably fixed to the extending portion of each of said bearing structures, actuating means for each of said brakes removably supported by said brake and bearing structure, a brake drum nonrotatably fixed to each of said axles and positioned thereby in externally telescoped, cooperative relation to said brake means, and a wheel nonrotatably secured to each of said axle shafts at the end portion thereof remote from said casing structure.

LOUIS JACOBI.

REFERENCES CITED

The following references are of record in the file of this patent:

UNITED STATES PATENTS

| Number | Name | Date |
|---|---|---|
| 1,400,170 | Kraft | Dec. 13, 1921 |
| 1,946,093 | Morgan | Feb. 6, 1934 |
| 2,247,668 | Rosenthal | July 1, 1941 |